Nov. 27, 1951   M. K. KUTHER   2,576,301
FISH CUTTING MACHINE
Filed Feb. 28, 1949   3 Sheets-Sheet 1

INVENTOR,
Max K. Kuther
BY
J. E. Trabucco
ATTORNEY.

Nov. 27, 1951     M. K. KUTHER     2,576,301
FISH CUTTING MACHINE
Filed Feb. 28, 1949     3 Sheets-Sheet 2
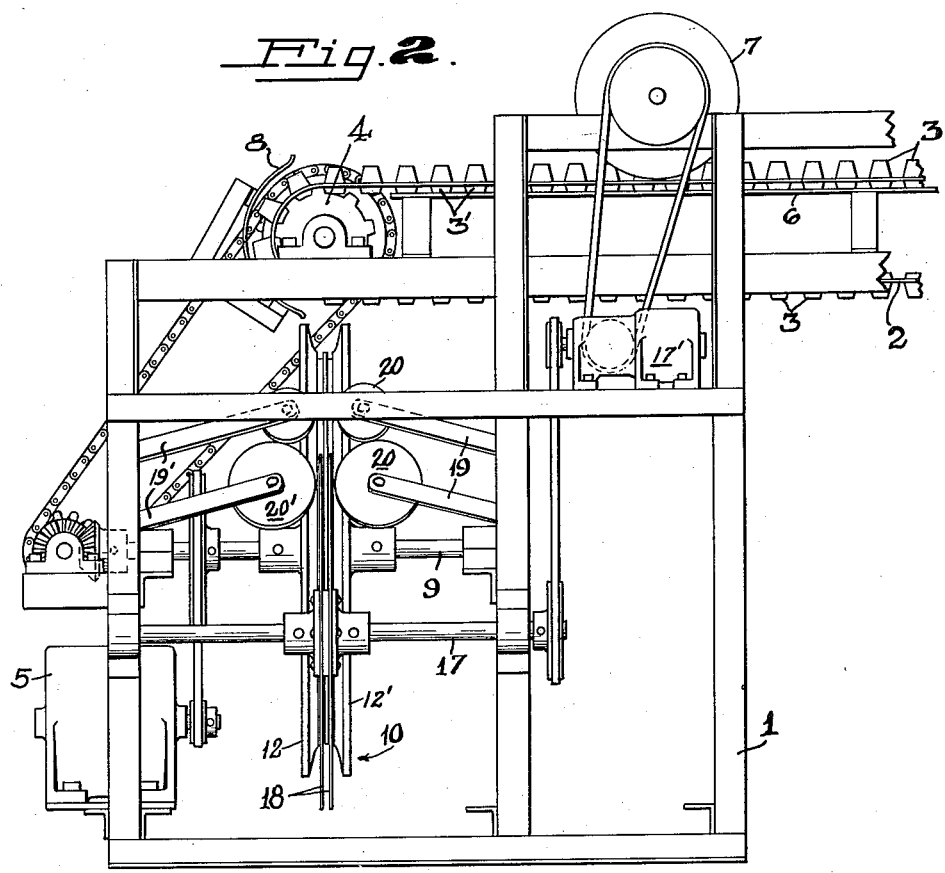
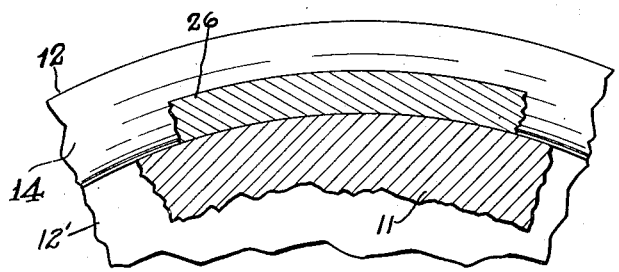
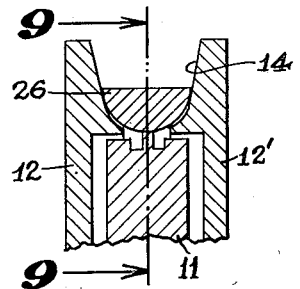
INVENTOR.
Max K. Kuther
BY
J. E. Trabucco
ATTORNEY.

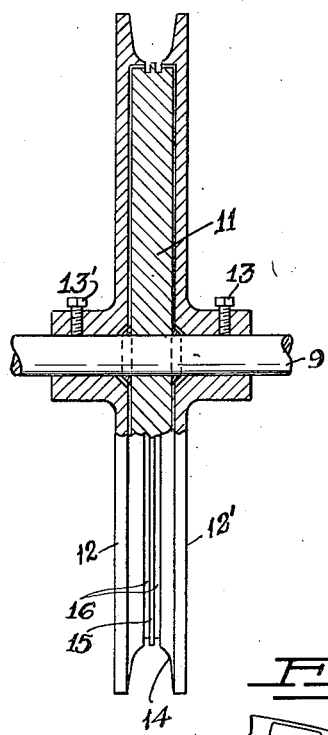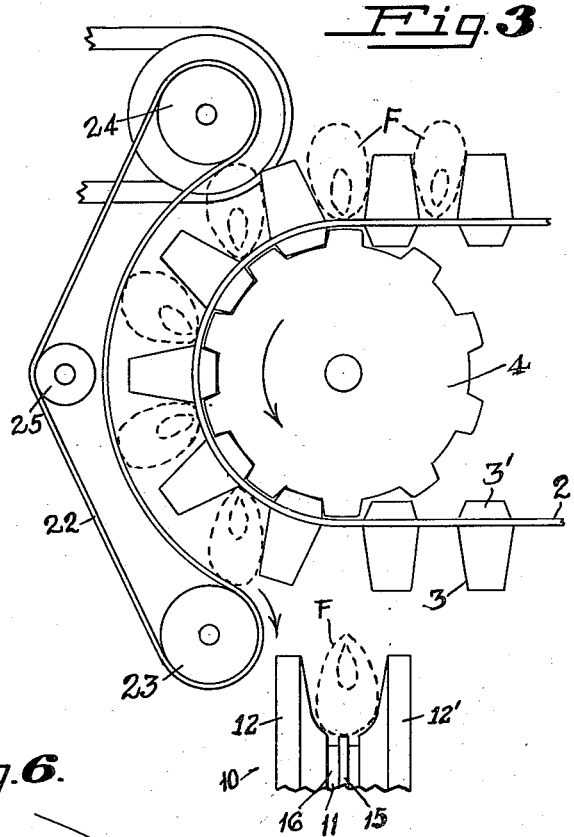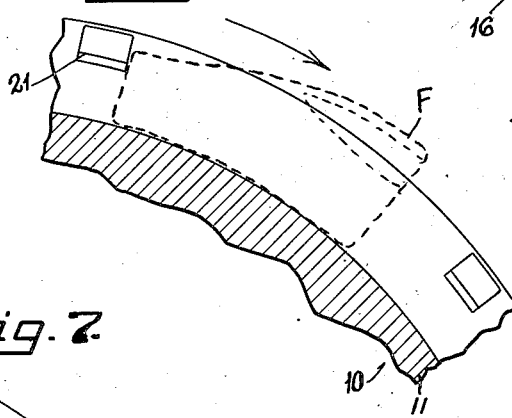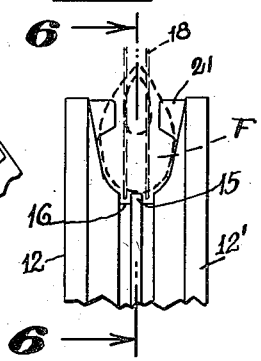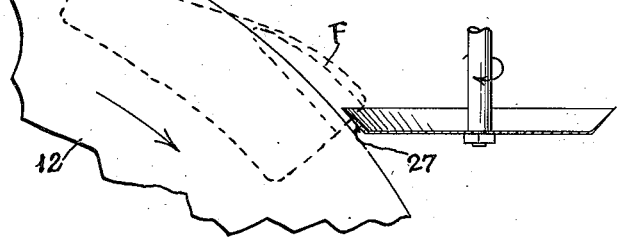

Patented Nov. 27, 1951

2,576,301

UNITED STATES PATENT OFFICE 2,576,301

FISH CUTTING MACHINE

Max K. Kuther, Monterey, Calif.

Application February 28, 1949, Serial No. 78,753

1 Claim. (Cl. 17—4)

This invention relates to an improved fish cutting machine, and more particularly to a novel machine for cutting fillets from fish.

The cutting machine embodying the present invention comprises a pair of spaced rotating circular knives arranged in operative association with a rotating fish advancing member or carrier which receives the fish from an endless conveyor and carries them successively into cutting engagement with the knives. The knives are so arranged with respect to the fish advancing member or carrier that the opposite sides of each fish are sliced therefrom as the said fish is carried into engagement with the knives.

The primary object of the present invention is to provide a continuously operating fillet cutting machine of the kind characterized which is designed to simultaneously slice the fleshy side portions from a number of fish as they are successively carried into cutting relation with a pair of adjustably spaced rotating knives by a slowly revolving carrier.

Other and further objects of the present invention will be pointed out hereinafter, will be indicated in the appended claim, or will be obvious to one skilled in the art upon an understanding of the disclosure. For the purpose of this application I have elected to show herein certain forms and details of a fish cutting machine embodying the principles of my invention; it is to be understood, however, that these are presented here for illustration purposes only and that therefore they are not to be regarded as exhaustive of the variations of the invention.

In the accompanying drawings:

Fig. 2 is a side view thereof;

Fig. 3 is an enlarged side elevation of an arrangement for causing the fish to assume a proper position on a rotatable carrier for cutting the sides therefrom;

Fig. 4 is an enlarged front view of a rotatable fish carrier embodying a part of the present invention, showing a portion thereof in section;

Fig. 5 is an enlarged view of a portion of the carrier showing diagrammatically a fish held thereon while engaged by the spaced rotating knives;

Fig. 6 is a sectional view taken on the line 6—6 of Fig. 5;

Fig. 7 is an enlarged detail of cutting means for removing the entrails from fish;

Fig. 8 is an enlarged sectional detail of means associated with the rotatable carrier for supporting the fish in a position whereby the entrail cutting means may operate effectively; and Fig. 9 is a sectional view taken on the line 9—9 of Fig. 8.

Figure 1:
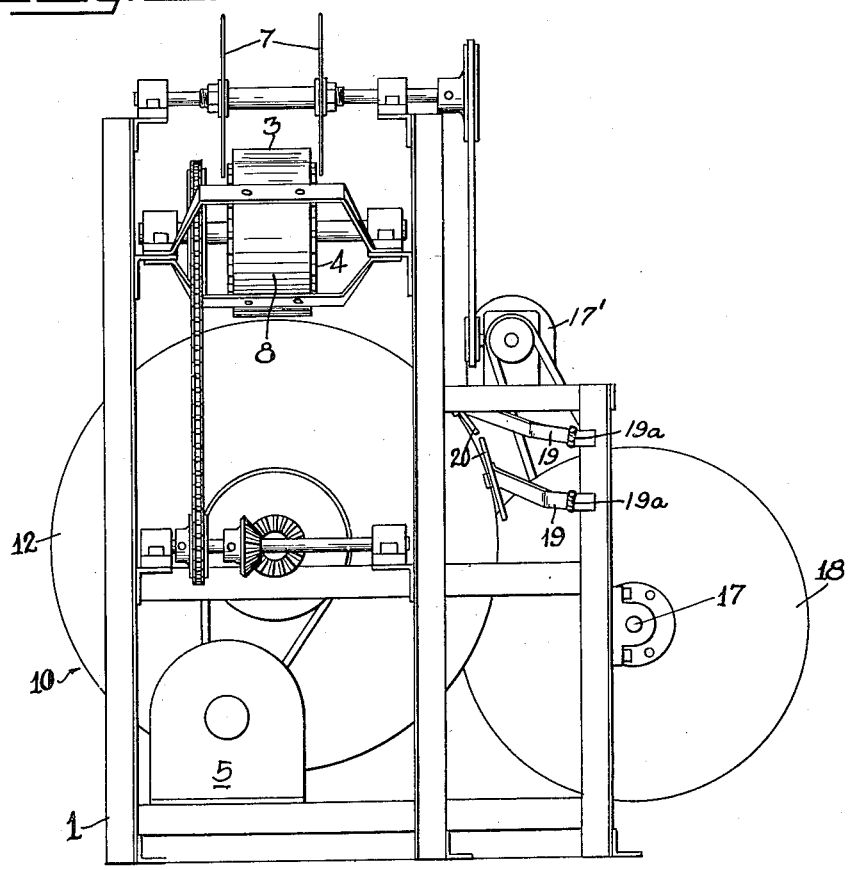
Fig. 1 is front view of a fish cutting machine embodying the preferred principles of my invention.

Referring to the drawings the numeral 1 designates a supporting structure or frame upon which the various parts of the machine are operatively mounted. Supported on the frame is an endless fish conveyor 2 having a plurality of spaced cleats 3 arranged thereon which form pockets for receiving and holding fish. The endless conveyor 2 extends over a transversely grooved drum 4 which is driven by an electric motor 5 at a predetermined uniform speed, the said motor also being operatively connected for driving purposes to other parts of the machine. A horizontal support 6, arranged beneath the upper flight of the conveyor, prevents the said upper flight from sagging. The cleats 3 are secured to inwardly protruding cleats 3' which are arranged to engage with the transverse grooves of the drum 4, thereby providing means for insuring the synchronized operation of the conveyor with respect to the drum. A pair of rotating knives 7 arranged at opposite sides of the conveyor 2 cut the heads and tails from the fish as they advance toward the drum 4. Mounted at the discharge end of the conveyor is a curved member 8 which is arranged to engage with and hold the fish on the conveyor while they are being carried around the drum 4 to the point of discharge underneath the said drum.

Mounted on and rotatable with a horizontal shaft 9 which is arranged at right angles with respect to the axis of the drum 4 is a fish carrier 10 which is arranged to receive fish as they are discharged from the conveyor 2. The fish carrier comprises a centrally disposed disc or wheel 11 fixed to the shaft 9 and two relatively adjustable wheels 12, 12' also secured to the said shaft by set screws 13, 13'. The wheels 12, 12' are formed peripherally with opposed beveled surfaces which provide a circular U-shaped open groove 14 for receiving fish discharged from the conveyor 2. The wheels 12, 12' are arranged at opposite sides of the disc 11 and the periphery of the latter has an outwardly protruding circular flange 15 which is disposed in slightly spaced relation to the inwardly extending flanges of the wheels' peripheries. The disc 11 is formed with two spaced peripheral grooves or slots 16 which are disposed at opposite sides of the flange 15.

Secured to a rotatable shaft 17 are two spaced circular knives 18 which are arranged to operatively extend into the peripheral grooves 16 of the disc 11. The shafts 9 and 17 are in parallel relation and they are rotated respectively, by the motor 5 and another motor 17' through suitable mechanical connections.

Rotatably mounted on pairs of pivoted arms 19, 19' which are pivoted at 19a, 19a, are discs 20, 20' which are arranged in pairs adjacent the periphery of the carrier 10. The discs 20, 20' of each pair are arranged in opposed relation overlying the peripheries of the wheels 12, 12'. The pairs of discs are adapted to engage with the opposite sides of the fish supported on the carrier 10 and thereby hold them in properly arranged positions while they are engaged by the cutting knives 18. The arms 19 are yieldably supported in positions whereby the discs 20 are normally in slightly spaced relation to the wheels 12. Formed on the inner sides of the peripheries of the wheels 12 are spaced pairs of inwardly protruding lugs 21 which act as stops to prevent the slipping of the fish in the groove 14 when they are carried into cutting engagement with the knives 18. (Figs. 5, 6 and 7.)

In operation, fish are placed by hand onto the endless conveyor 2 with their bellies disposed downwardly. The fish are first conveyed into cutting engagement with the revolving knives 7 which cut the heads and tails therefrom. The fish with their heads and tails removed are conveyed toward the drum 4 and into engagement with the curved member 8 which normally holds them against displacement or change of position with respect to the conveyor 2 as they are carried around the forward side of the said drum. As the fish successively pass from the lower end of the curved member 8 they fall belly up into the groove 14 of the rotating carrier 10. The carrier conveys the fish successively into cutting engagement with the rotating circular knives 18 which slice fillets from the opposite sides of each fish as the latter is carried past the knives. It will be noted that the pairs of discs 20 maintain the fish in positions in which their bellies are in outwardly disposed positions and their opposite longitudinal sides are in substantially parallel relation to the knives 18. A pair of spaced lugs 21 engage with an end of each fish and prevent it from slipping in the groove 14 as the said fish is carried into engagement with and past the said knives 18. The fish shown in broken lines are indicated at F.

In a modified form shown in Fig. 3, a flexible endless belt 22 extending over two vertically arranged pulleys 23 and 24, the latter of which is power driven, is arranged to engage with the fish as they are conveyed forwardly over the drum 4. The belt 22 also engages with an idler roller 25. The said belt 22 is arranged to travel slightly faster than the endless conveyor 2, thereby causing each fish to slightly turn as it reaches the lower pulley 23 and assume a position with its belly up as it falls into the groove 14 of the rotating carrier 10.

In the modified form shown in Figs. 7, 8 and 9 a split ring 26 is mounted in the groove 14 of the rotatable carrier 10. The split ring holds the fish outwardly from the inner edges of the groove 14 so that its belly portion may be sufficiently exposed beyond the periphery of the carrier to permit its engagement by a rotating circular knife 27 (Fig. 7). As the carrier conveys the fish in the direction indicated by the arrow in Fig. 7 it is brought into engagement with the rotating knife 27. The cutting edge of the said knife extends across the groove 14 and as the exposed belly portion of the fish engages with the said knife it is cut away, thereby leaving the desirable side portions for subsequent removal if so desired by the apparatus shown in Figs. 1 and 2. The carrier 10 may be equipped with the split ring 26 by first unscrewing one of the set screws 13 and then shifting the loosened wheel 12 to a position in which the said split ring may be placed over the disc 11. The wheels 12 may be adjusted away from or toward each other to increase or decrease the width of the groove 14, depending upon the size of fish from which the fillets are to be cut. The conveyor 2 and the carrier 10 are suitably synchronized so that a fish will be deposited in the groove 14 at timely intervals.

What I claim is:

In a fish slicing machine, a rotatable fish carrier having an annular groove in its periphery, means synchronized with the carrier for delivering fish to the groove of the carrier, a pair of rotatable fish engaging members arranged in opposed spaced relation at opposite sides of and adjacent the periphery of the carrier, the said rotatable members extending partially across the peripheral groove of the carrier, and a pair of laterally spaced rotatable fish cutting knives extending into the groove of the carrier between the rotatable members, the said knives being arranged for cutting engagement with the fish while they are engaged by the fish engaging members.

MAX K. KUTHER.

REFERENCES CITED

The following references are of record in the file of this patent:

UNITED STATES PATENTS

| Number | Name | Date |
| --- | --- | --- |
| 522,414 | Holden | July 3, 1894 |
| 1,030,646 | Cleveland | June 25, 1912 |
| 1,078,719 | Cleveland | Nov. 18, 1913 |
| 1,125,657 | Cleveland | Jan. 19, 1915 |
| 1,819,060 | Baader | Aug. 18, 1931 |
| 2,027,257 | Vogt | Jan. 7, 1936 |
| 2,470,289 | Christiansen | May 17, 1949 |
| 2,521,640 | Laurin | Sept. 5, 1950 |